United States Patent [19]
Slocum

[11] 3,784,236
[45] Jan. 8, 1974

[54] FITTING FOR FLEXIBLE CONDUITS
[75] Inventor: Fred H. Slocum, Pittsburgh, Pa.
[73] Assignee: Robroy Industries, Verona, Pa.
[22] Filed: Oct. 5, 1971
[21] Appl. No.: 186,683

[52] U.S. Cl.................... 285/45, 285/115, 285/249
[51] Int. Cl............................................. F16l 11/12
[58] Field of Search................... 285/45, 114, 115, 285/116, 249

[56] References Cited
UNITED STATES PATENTS

| | | | |
|---|---|---|---|
| 2,449,916 | 9/1948 | Tandet | 285/249 |
| 2,700,988 | 2/1955 | Smisko | 285/115 |
| 3,535,136 | 10/1970 | Beene | 285/45 UX |

FOREIGN PATENTS OR APPLICATIONS

| 552,863 | 4/1943 | Great Britain | 285/115 |
|---|---|---|---|

*Primary Examiner*—Mervin Stein
*Assistant Examiner*—David H. Corbin
*Attorney*—Stanley J. Price, Jr.

[57] ABSTRACT

An improved fitting, especially a compression coupling, for flexible conduits, such as flexible plastic hose and the like. A coupling includes a coupling nut assembly and further includes a rigid, usually metallic, nipple having a fluid passageway therethrough. The nipple is adapted to slidably receive and mount a flexible conduit thereon whereby the conduit may pass into and be received by the coupling. The coupling nut assembly comprises male and female members adapted to be engaged, as by threading, whereby an annular gasket is urged into annular compressing contact with a conduit in the coupling. Integral sleeve means are provided extending from said coupling in operable contact with said conduit whereby crimping or breaking of the conduit near the end of the nipple on which it is mounted is substantially eliminated. Preferred sleeve means comprises a polymeric coating, especially a polyvinylchloride coating, bonded to the coupling nut assembly and terminating in a polymeric annular sleeve extending from the coupling nut assembly and terminating in a polymeric annular sleeve extending from the coupling nut and adapted to receive a flexible conduit passing into the coupling. In that fashion, crimping and breaking of the flexible conduit in the coupling is substantially prevented.

6 Claims, 2 Drawing Figures

PATENTED JAN 8 1974 3,784,236

FITTING FOR FLEXIBLE CONDUITS

BACKGROUND OF THE INVENTION

1. Field of the Invention

This invention relates to fittings for flexible conduits and the like, and more particularly to a compression coupling for such conduits.

2. Description of the Prior Art

In conventional compression couplings for flexible conduits, a coupling nut assembly of varying kinds is ordinarily provided having a nipple over which a flexible conduit may be slidably fitted for mounting within the coupling. In most cases the nipple comprises a rigid, ordinarily metallic, nipple having a plurality of annular serrations extending rearwardly of the coupling over which a flexible conduit such as a flexible plastic hose or the like, may be slidably mounted. While in use, the flexible conduit is often bent. In so doing, the conduit walls tend to crimp or gather at one portion and at the same time thin out or stretch along an opposite portion near the terminal end of the nipple. For that reason the conduit has ordinarily crimped or broken at a point adjacent the nipple or adjacent the conduit's point of entry into the coupling.

A non-integral stiffener sleeve has been proposed for positioning on the outer surface of the flexible conduit adjacent the coupling to prevent crimping or breaking of the conduit at its connection to the coupling. Such non-integral sleeves have not been entirely satisfactory for the reason that they slide down the conduit away from the coupling and do not serve as a stiffener adjacent the coupling. Additionally, the non-integral stiffener sleeves are often carelessly omitted when the conduit coupling is assembled.

This invention provides an improved coupling for flexible conduits. More specifically, the invention provides a compression coupling for flexible conduits which substantially prevents crimping or breaking of a conduit at the coupling. In one emobdiment, the invention provides an improved, long-life coupling of the type described wherein the coupling is effectively sealed from corrosive atmospheres.

SUMMARY OF THE INVENTION

This invention provides an improved coupling for flexible conduits, such as flexible plastic hoses, or the like. The coupling includes a coupling nut assembly having therein a rigid, usually metallic nipple with a fluid passageway therethrough. The nipple preferably includes a plurality of annular serrations extending rearwardly of the coupling and is adapted to slidably receive and mount a flexible conduit thereon whereby the conduit may pass into and be mounted in said coupling. The coupling nut assembly comprises male and female members adapted to be engaged whereby an annular gasket is urged into annular compressing contact with the conduit in the coupling. Preferably the coupling nut assembly comprises an externally threaded male member and an internally threaded female member, and the annular gasket comprises an elastomeric composition, such as rubber, or a rubber-like composition.

Integral sleeve means are provided extending from the coupling nut assembly in operable contact with the conduit for preventing crimping or breaking of the flexible conduit near the end of the nipple on which it is mounted or at the edge of the coupling nut assembly proper. Preferably, sleeve means are provided for the portion of flexible conduit entering the coupling nut assembly, beginning at the coupling nut per se and extending along the conduit a distance therefrom whereby the bending radius of the conduit at the coupling is extended and whereby breaking or crimping of the conduit is prevented. Most preferably, a polymeric coating, such as polyvinylchloride coating, is provided bonded to the coupling nut assembly and terminating in an integral polymeric annular sleeve extending from the coupling nut. The polymeric sleeve thus provided most preferably has an inside diameter substantially equal to the outside diameter of the flexible conduit and is adapted to receive the flexible conduit as it passes into the coupling.

Other advantages and details of the invention will become apparent by reference to the appended drawings and as the following more detailed description thereof proceeds.

DESCRIPTION OF THE PREFERRED EMBODIMENTS

Figure 1:
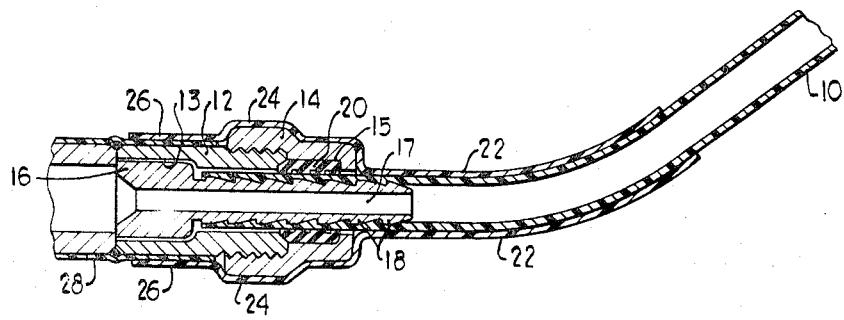
FIG. 1 is a sectional elevation of a compression coupling according to the invention.

Referring now to FIG. 1, a compression coupling according to the invention for a flexible conduit 10 is shown. The coupling includes a coupling nut assembly having externally threaded male member 12 and internally threaded female member 14. Externally threaded male member 12 includes a bore 13 therein adapted to receive and seat a nipple 16. Nipple 16 comprises a rigid, usually metallic composition and has an annular fluid passageway 17 therethrough through which fluids from a source, such as a main fluid line (not shown) may pass. The coupling nut assembly may be connected to a main fluid line in conventional fashion, for example, as by welding or by threading into an appropriate manifold or pipe fitting (not shown). Nipple 16 includes a plurality of annular serrations 18 and is adapted to slidably receive and mount flexible conduit 10 in the coupling nut assembly. Serrations 18 on nipple 16 extend rearwardly, as illustrated, of the coupling nut assembly and aid in preventing slipping or loosening of conduit 10 within the coupling.

The coupling nut assembly further includes an annular gasket 20 which preferably comprises an elastomeric composition such as a natural or synthetic rubber, or rubber-like compositions. Annular gasket 20 is disposed within a bore 15 provided in internally threaded female member 14 of the coupling nut assembly in a manner whereby threadably engaging the respective male and female member for threadably advancing female member 14 may compress gasket 20 into annular compressing contact with flexible conduit 10 on nipple 16. Specifically, gasket 20 is wedged against the leading edge of male member 12 of the coupling nut assembly when female member 14 is threadably advanced. In that fashion tightening of the coupling nut assembly may efficiently compress annular gasket 20 against flexible conduit 10 for effectively holding the conduit in the coupling nut assembly.

Figure 2:
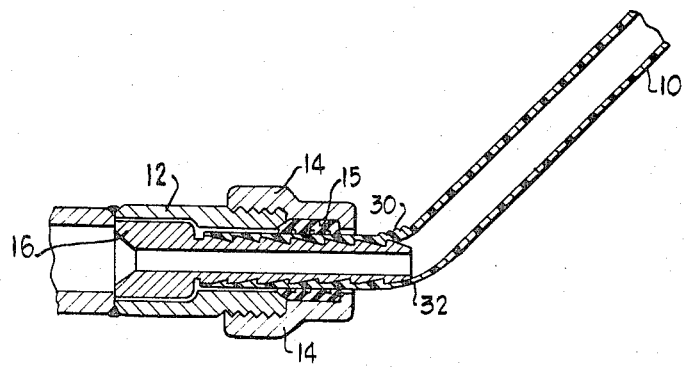
FIG. 2 is a sectional elevation illustrating the distortion in the walls of a flexible conduit when bent at the coupling nut assembly whereby crimping or breakage of a conduit may occur.

In the embodiment shown in the Figures, nipple 16 extends from within to without the coupling nut assembly. When flexible conduit 10 is bent, the conduit walls tend to gather along one side and thin out or stretch along the opposite side. The gathering and thinning out of the conduit side walls is illustrated at 30 and 32, respectively, in FIG. 2. For that reason, the conduit has tended to break and crimp at the terminal end of nipple 16. In the case where nipple 16 does not extend beyond a coupling nut assembly (not shown), conduit 10 has tended to crimp and break at the point of entry of the conduit into the coupling nut assembly, for example, at the point of entry of conduit 10 into internally threaded female portion 14 of the coupling nut assembly shown. In order to prevent or minimize the tendency of conduit 10 to break or crimp as described, an integral sleeve 22 is provided for extending the bending radius of conduit 10 around nipple 16 or at its point of entry into the coupling nut assembly. Preferably, sleeve 22 comprises a resilient polymeric annular sleeve. Most preferably, sleeve 22 comprises a resilient polymeric annular sleeve formed integrally of a polymeric coating bonded to the coupling nut assembly. In FIG. 1, female member 14 of the coupling nut assembly is provided with a polymeric coating 24. Coating 24 is bonded to female coupling nut member 14 and has formed integrally thereof polymeric annular sleeve 22 for conduit 10. Sleeve 22 is adapted to receive conduit 10 passing into the coupling and extends for some distance beyond the coupling nut assembly along conduit 10. Most preferably, sleeve 22 extends a distance of greater than about one inch, for example several inches, along flexible conduit 10.

It should be noted here that the sleeve means as thus far described for extending the bending radius of a flexible conduit 10 has application for a variety of conduit compositions; in fact, wherever conjoint thinning and gathering of flexible conduit side walls may occur. For example, and by way of illustration, flexible conduit 10 may comprise a synthetic polymeric composition such as polyethylene, polypropylene, polyvinylchloride, styrene-butadiene copolymer, copolymer and similar flexible polymeric compositions. Moreover the sleeve means is useful where thin-walled flexible metallic tubing, such as copper tubing or flexible steel conduit, and the like, is employed.

In the embodiment shown in FIG. 1, a compression coupling for flexible conduits is shown which provides an effective seal for protecting the coupling nut assembly components from corrosive vapors which may be present in the atmosphere. The polymeric film coating 24 bonded to female member 14 includes a rearwardly (as shown) extending annular sleeve portion 26 adapted to sealably contact male coupling member 12 of the coupling nut assembly. Most preferably male coupling member 12 likewise includes a polymeric coating 28 bonded thereto.

Preferred polymeric compositions for coatings 24 and 28 and for sleeves 22 and 24 include chemically resistant, somewhat flexible, or resilient, synthetic polymeric compositions. Most preferred polymeric compositions include polyvinylchloride and like compositions.

It may be noted here that, although the invention has been described with respect to fluid-carrying conduits, it also has application where other type of flexible conduits, such as electrical wiring, are employed. In that case, of course, the coupling nut assembly need not include a nipple means for preventing collapse of the conduit under compressing forces.

The foregoing has described the invention and certain preferred embodiments thereof. It should be expressly understood, however, that the invention is not necessarily limited to the specific embodiments disclosed therein but may be variously practiced within the scope of the following claims.

I claim:

1. A compression coupling for a flexible conduit comprising,
   a flexible conduit,
   a coupling nut assembly including a male coupling member, a female coupling member, a nipple and an annular gasket,
   said nipple having a fluid passageway therethrough and an external surface to receive an end portion of said flexible conduit, said nipple with said flexible conduit end portion positioned thereon positioned in said female coupling member with said flexible conduit extending through said female coupling member and having a portion extend beyond said female coupling member,
   said annular gasket positioned in said female coupling member around said conduit end portion positioned on said nipple,
   said male coupling member threadably engaged in said female coupling member and compressing said annular gasket to frictionally engage said conduit end portion to said female coupling member and said nipple, and
   a resilient polymeric coating bonded around the outer surface of said female coupling member, said polymeric coating having a cylindrical resilient polymeric sleeve portion formed integrally therewith, said sleeve portion extending from said resilient polymeric bonded coating with said flexible conduit extending therethrough, said cylindrical sleeve having a sufficient length to permit bending of said flexible conduit and extending the bending radius of said flexible conduit to reduce crimping of said flexible conduit upon bending of said flexible conduit and said sleeve adjacent to said female coupling member.

2. The compression coupling as set forth in claim 1 in which said sleeve has an inner diameter substantially equal to the external diameter of said flexible conduit.

3. The compression coupling as set forth in claim 2 wherein said sleeve means comprises a polyvinylchloride composition.

4. The compression coupling as set forth in claim 1 wherein,
   said bonded coating on said female coupling member includes a second sleeve extending in a direction opposite to said first sleeve and said second sleeve extends around the outer surface of said male coupling member.

5. The compression coupling as set forth in claim 4 in which,
   said male coupling member includes a bonded coating on a portion of the outer surface thereof,
   said second sleeve on said female coupling member positioned in overlying relation with said bonded coating on said male coupling member.

6. The compression coupling as set forth in claim 1 in which said sleeve has a length that extends for several inches over the surface of said flexible conduit.

* * * * *